US012188157B2

United States Patent
Hagström et al.

(10) Patent No.: US 12,188,157 B2
(45) Date of Patent: Jan. 7, 2025

(54) PROCESS FOR WET SPINNING OF CELLULOSE FIBERS FROM AN ALKALINE SPIN BATH

(71) Applicant: TREETOTEXTILE AB, Bjärred (SE)

(72) Inventors: Bengt Hagström, Gothenburg (SE); Tobias Köhnke, Svanesund (SE); Jonas Engström, Nödinge (SE)

(73) Assignee: TREETOTEXTILE AB, Bjärred (SE)

( * ) Notice: Subject to any disclaimer, the term of this patent is extended or adjusted under 35 U.S.C. 154(b) by 479 days.

(21) Appl. No.: 17/428,687

(22) PCT Filed: Feb. 20, 2020

(86) PCT No.: PCT/SE2020/050198
§ 371 (c)(1),
(2) Date: Aug. 5, 2021

(87) PCT Pub. No.: WO2020/171767
PCT Pub. Date: Aug. 27, 2020

(65) Prior Publication Data
US 2022/0112628 A1    Apr. 14, 2022

(30) Foreign Application Priority Data
Feb. 21, 2019 (SE) .................................. 1950223-6

(51) Int. Cl.
*D01D 5/06* (2006.01)
*D01D 5/22* (2006.01)
(Continued)

(52) U.S. Cl.
CPC ................. *D01D 5/06* (2013.01); *D01D 5/22* (2013.01); *D01D 10/06* (2013.01); *D01F 1/10* (2013.01); *D01F 2/24* (2013.01)

(58) Field of Classification Search
CPC ............ D01D 5/06; D01D 5/22; D01D 10/06
See application file for complete search history.

(56) References Cited

U.S. PATENT DOCUMENTS 4,387,476 A * 6/1983 Bueb ........................ D06B 3/20
                                                           8/151.2
4,762,564 A * 8/1988 Bridgeford ............... D01F 2/00
                                                          106/170.57

(Continued)

FOREIGN PATENT DOCUMENTS

CA        3055372      *  9/2018
CN     101423986 B       12/2010
(Continued)

OTHER PUBLICATIONS

International Search Report mailed May 14, 2020 for PCT Application No. PCT/SE2020/050198.
(Continued)

*Primary Examiner* — Edmund H Lee
(74) *Attorney, Agent, or Firm* — MOSER TABOADA

(57) ABSTRACT

A process for forming a fiber tow, involves a wet spinning procedure comprising the steps of: dissolving cellulose pulp N in an alkaline aqueous solvent to form a cellulose spin dope composition, spinning the cellulose spin dope composition in a coagulation having a p H of more than 7.0, preferably a pH of at least 10, to produce a fiber tow, and passing the produced fiber tow through a sequence of consecutive stretching and washing steps in which the formed fiber tow is washed with a washing liquid by a counter-current flow washing procedure.

36 Claims, 7 Drawing Sheets

(51) Int. Cl.
  *D01D 10/06* (2006.01)
  *D01F 1/10* (2006.01)
  *D01F 2/24* (2006.01)

(56) References Cited

U.S. PATENT DOCUMENTS

| | | | |
|---|---|---|---|
| 9,695,525 | B1 | 7/2017 | Kaukler |
| 2019/0048490 | A1 | 2/2019 | Abels et al. |

FOREIGN PATENT DOCUMENTS

| | | | |
|---|---|---|---|
| CN | 204589392 | U | 8/2015 |
| CN | 106757906 | A | 5/2017 |
| CN | 105063782 | B | 8/2017 |
| CN | 206467350 | U | 9/2017 |
| CN | 105648561 | B | 5/2018 |
| CZ | 282262 | * | 6/1997 |
| EP | 3231899 | A1 | 10/2017 |
| EP | 3231901 | * | 10/2017 |
| EP | 3231901 | A1 | 10/2017 |
| GB | 787560 | A | 12/1957 |
| JP | H-0340806 | A | 2/1991 |
| JP | 2010532827 | A | 10/2010 |
| JP | 2019513915 | A | 5/2019 |
| PL | 214564 | B1 | 8/2013 |
| WO | WO-2014041251 | A1 | 3/2014 |
| WO | WO-2015000820 | A1 | 1/2015 |
| WO | WO-2018014510 | A1 | 1/2018 |
| WO | WO-2018169479 | A1 | 9/2018 |
| WO | WO20180169479 | * | 9/2018 |

OTHER PUBLICATIONS

Supplemental European Search Report for Application No. EP20758735 dated Sep. 30, 2022.
Swedish Search Report for Application No. 2250296-7 filed Feb. 21, 2019.

* cited by examiner

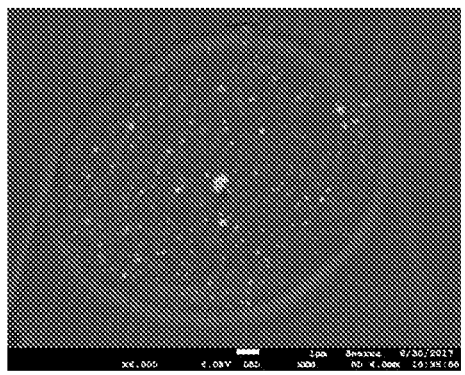 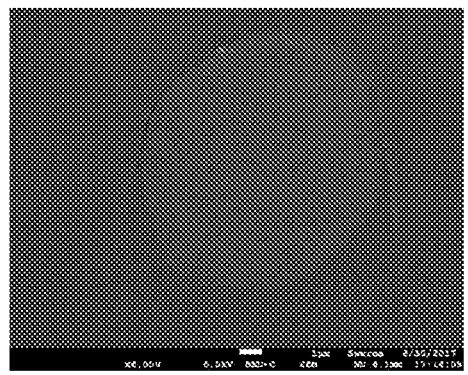
Fig. 6aFig. 6b
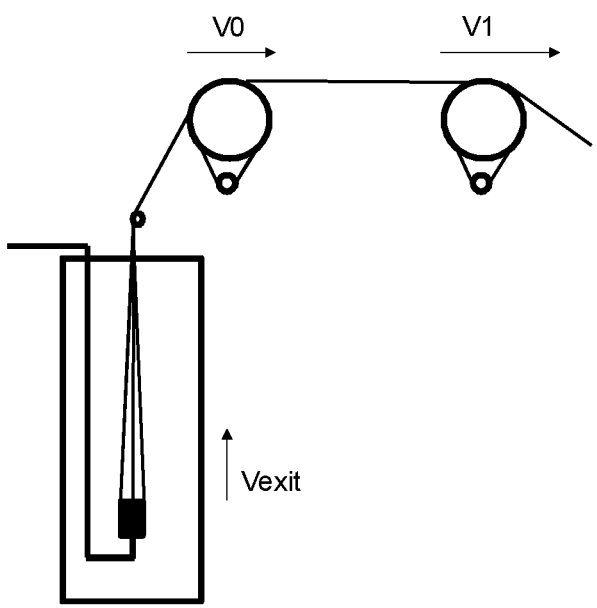
Fig. 7

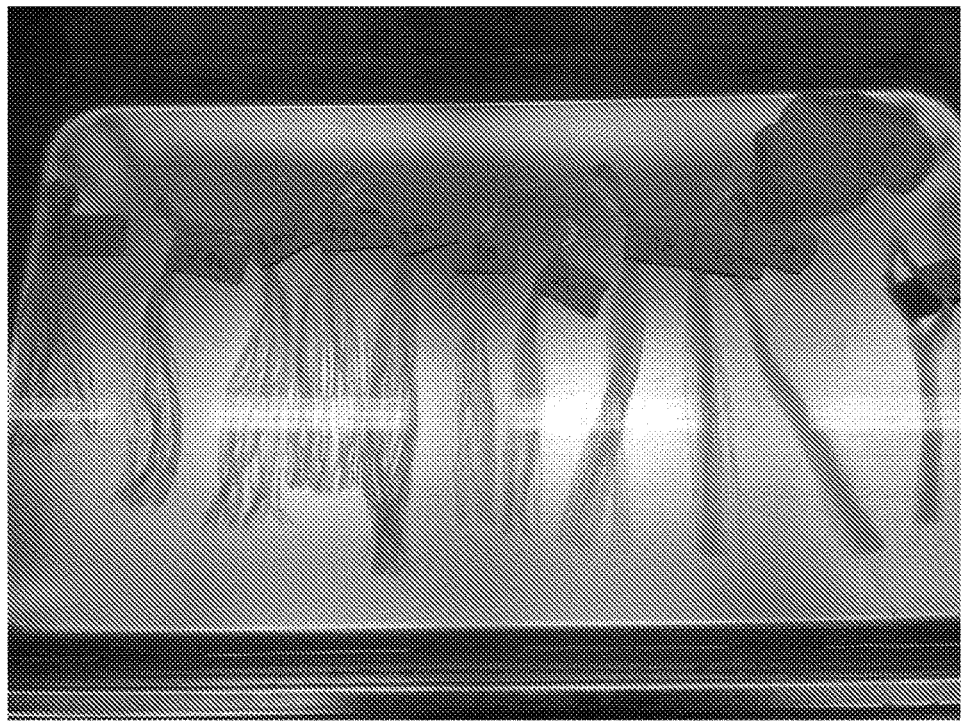
Fig. 8
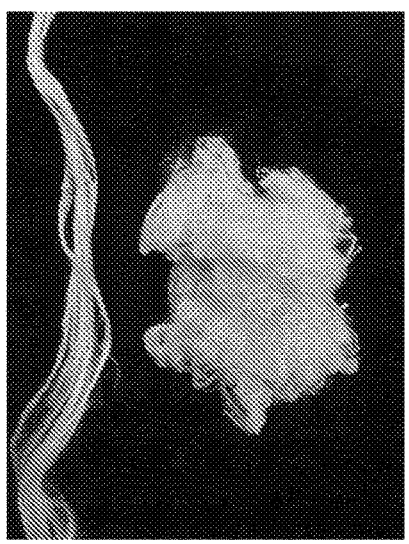
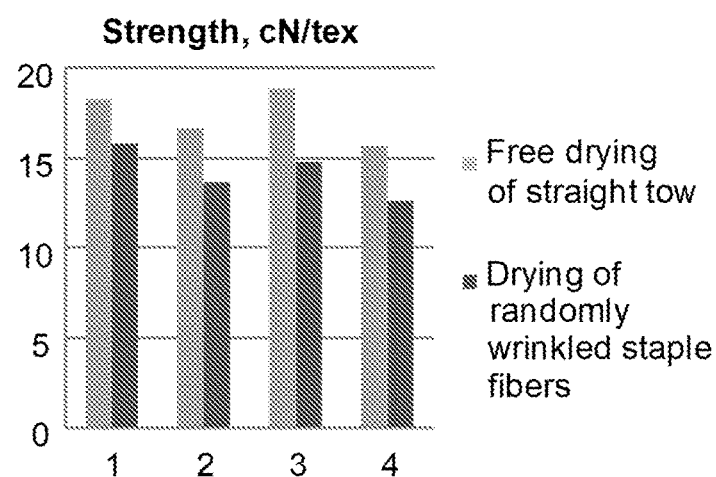
Fig. 9a    Fig. 9b

PROCESS FOR WET SPINNING OF CELLULOSE FIBERS FROM AN ALKALINE SPIN BATH

FIELD OF THE INVENTION

The present invention relates to a process for forming and processing a fiber tow, especially to a process involving stretching and washing and drying of a fiber tow. The present invention further relates to a spinning line unit for forming and processing a fiber tow.

TECHNICAL BACKGROUND

There exist different types of fiber forming processes. In the viscose process derivatized cellulose (cellulose xanthate) is dissolved in NaOH solution and the resulting spin dope is coagulated in an acidic spin bath. Both NaOH from the spin dope and $H_2SO_4$ from the spin bath are consumed (chemical reaction) forming $Na_2SO_4$, a chemical of low economical value nowadays. $CS_2$ from the derivatization is also lost to a significant degree. Chemicals are thus not recycled. Another feature of the viscose process is that the tow is stretched after the spin bath where after the fiber tow is cut to staple fibers. After cutting, the staple fibers are randomly spread out on a slowly moving wire mesh on which the fibers are washed with water in a counter current flow fashion. After bleaching and application of finishing agents the fiber fleece bed is mechanically opened and the lose fibers are dried with hot air.

In contrast, there are processes using alkaline spin baths, where recycling of chemical is possible. One such process is disclosed in WO2018/169479, which relates to a method for making a regenerated cellulosic fiber composition. The method comprises providing a spinning dope comprising a solution of cellulose and an additive in an alkaline solvent in which solvent cellulose is present at a concentration of from about 5 to 12% by weight and the additive is present in the range of from 0.1-10% by weight calculated on the cellulose, contacting the cellulose spinning dope with an aqueous coagulation bath fluid having a pH value above 7, forming a regenerated cellulosic fiber composition; and stretching and washing the fiber composition in one or more washing and stretching baths.

A related process is disclosed in EP 3 231 901 A1 in which cellulose is dissolved in an aqueous NaOH solution to provide a cellulose spin dope. The spin dope is extruded into a coagulation liquid comprising an aqueous sodium salt solution. EP 3 231 901 A1 also describes a method of separating (cooling crystallization) and recycling the sodium hydroxide and the sodium salt in the liquids withdrawn from the coagulation bath and the subsequent wash bath(s).

A preferred methodology of preparing a spin dope by direct dissolution of cellulose in cold alkali, which is suitably used in conjunction with the process for forming and processing a fiber tow according to the present invention, is described in EP3231899A1.

The paramount difference between an acidic and an alkaline spin bath for coagulation of an alkaline cellulose solution is that the network of precipitated cellulose fibrils in the latter case becomes highly swollen until the alkali is washed out from the structure while the instant neutralization of alkali in the acidic spin bath brings about an almost instant densification of the fibrillar cellulose structure.

Compared to the viscose process using an acidic spin bath, known processes using alkaline spin baths thus brings about new challenges suitable to be mastered. These challenges relate to inter alia productivity issues, to fiber quality/property issues and recycling issues.

SUMMARY OF THE INVENTION

The present invention is directed to providing an improved process for forming cellulose fibers where said process is based on the technology involving alkaline spin/coagulation baths and where the process is improved in terms of produced fiber quality. More specifically there is described various aspects that may applied alone or in combination to obtain improved processes having one or more of the following advantages:

creating strong fibers by stretching a fiber tow under gradually decreasing alkaline conditions under simultaneous washing making the obtained cellulose molecular orientation a permanent feature of the fiber and thus to prevent relaxation of the orientation obtained by the stretching process, and/or reducing or even avoiding fiber to fiber adhesion impairing downstream operations like carding, sliver manufacture and yarn spinning, and/or washing out, to a high degree, zinc compounds from the fiber tow and facilitating the recycling of zinc in the process for reuse in spin dope preparation, and/or reducing dried-in wrinkles during the drying process deteriorating fiber strength of final dry fiber, and/or obtaining mechanically crimped fibers with maintained fiber strength It has been found that one or more of the above mentioned issues related to fiber production from directly dissolved cellulose in alkali, preferably cold alkali, and regeneration in alkaline spin bath can be solved or improved by a process characterized by that fibers exiting the spin bath are gathered in the form of a tow and that the fibers are maintained in tow form through all consecutive process steps from the spin bath up to the final cutting of the fiber tow into staple fibers.

One or more of the stated purposes are achieved by a process for forming a fiber tow, said process involving a wet spinning procedure comprising the steps of:

dissolving cellulose pulp in an alkaline aqueous solvent to form a cellulose spin dope composition, spinning the cellulose spin dope composition in a coagulation bath having a pH of more than 7.0, preferably a pH of at least 10, to produce a fiber tow, and passing the produced fiber tow through a sequence of consecutive stretching and washing steps in which the fiber tow is washed with washing liquid having gradually lower alkalinity. It should be noted that the stretching may be performed before and/or during the washing steps.

In relation to the expression "consecutive stretching and washing steps" it should be noted that the process according to the present invention is directed to a process comprising at least two washing steps. Regarding stretching, however, this may be performed by different means according to the present invention. One alternative is to perform stretching directly after spinning in the coagulation bath. The fiber tow may then be kept at a stretched condition, not necessarily with any provided elongation, through the washing steps of the procedure. This and perspectives therefore are further explained below.

Furthermore, alternatives to stretching with and without provided elongation are possible through the washing procedure according to the present invention. Moreover, as another alternative washing may be performed with the fiber tow in a somewhat slacker condition and where the fiber tow is stretched between e.g. a third and a fourth washing step.

It should be noted that this is just one alternative, and many others are totally possible according to the present invention. Again, alternatives and explanations are further present below.

Preferably, the step of dissolving the cellulose pulp is performed in a cold alkaline aqueous solvent at a temperature of 0° C. or lower.

Moreover, preferably the washing steps are performed by a counter-current flow washing procedure.

Furthermore, preferably the washing procedure is performed so as to maintain the tension in the fiber tow up to a point where a sodium hydroxide concentration in the fiber tow is lower than 0.3 wt. %.

As stated above, the present invention is directed to a process involving spinning the cellulose spin dope composition in a coagulation bath having a pH of more than 7.0, preferably a pH of at least 10, and often well above also pH 10. This implies that the process according to the present invention is significantly different to the so-called viscose technology in which the cellulose is derivatized by mean of $CS_2$ before being dissolved in alkali and in which the fibers are regenerated in an acidic coagulation bath.

The process according to the present invention in which the alkalinity of the fiber tow is gradually decreased during the stretching and washing process preferably involves a counter-current flow washing procedure.

The different perspectives are further discussed below.

EMBODIMENTS OF THE INVENTION

Below embodiments of the present invention are discussed in more detail.

According to one embodiment, the process comprises passing the produced fiber tow through at least five consecutive washing steps, preferably at least seven consecutive steps, more preferably at least ten consecutive steps. According to one embodiment the number of washing steps is in the range of 10-20. Less washing water is needed when several steps are used. This is an advantage with reference to the recovery economy as a less amount of water must be treated.

According to the present disclosure, each washing step may be seen as a single unit operation. The fiber tow, being produced by being spun from the cellulose spin dope composition in the coagulation bath, is passed through subsequent washing steps. Each single washing step may be seen as an operation where the fiber tow is being processed by being run into and through the corresponding washing step and then out from that washing step. Each washing step could, as example, involve passing the fiber tow through a washing bath, i.e. submerging the tow in washing liquid, or the tow could be sprayed with a washing liquid, or a combination of submerging and spraying could be employed. According to one embodiment of the present invention, at least one washing step is performed by spraying, preferably the flow of spray washing liquid in at least some of the washing steps with spraying, or preferably in each washing step with spraying, is at least 5 kg washing liquid per kg of cellulose spin dope composition supplied to the coagulation bath, more preferably at least 8 kg washing liquid per kg of cellulose spin dope composition. Spraying is further discussed below in relation to comparative trials with immersion washing (see FIG. 12).

It should, however, be noted that a single washing step does not have to be defined by a specific washing bath. It should further be noted that the term "bath" merely indicate that the fiber tow is being put in contact with the washing liquid of the washing step under consideration. Such a contact can be arranged in a multitude of ways and does not necessarily mean a "bath" literally. A washing step is defined by the tow being washed with a washing liquid having a composition which is different from the composition of the washing liquid in an upstream and/or downstream washing step. This separation of washing liquid composition between washing steps could be achieved, for example, by the incoming fiber tow being pressed thereby decreasing carry over of washing liquid from the former washing step and that the fiber tow in the specific step is subjected to the specific washing liquid in that washing step during a certain residence time and is, for example, mechanically and/or hydraulically worked in a substantially thin and flat shape over one or several rollers to induce convection/-displacement of liquid within the fiber tow and then again being pressed from that washing liquid when being processed out from that washing step. In this regard it may be mentioned that the more washing liquid being pressed out from the fiber tow when moving the fiber tow from one washing step to a subsequent washing step, the more efficient the washing procedure is, implying that a smaller number of washing steps is needed and/or a less amount of washing water has to be used.

The washing liquid in each consecutive washing step can be characterized by its chemical composition in terms of sodium hydroxide (NaOH) and coagulation salt (e.g. Na2CO3 or Na2SO4 or a mixture thereof) concentration. The tow going into a washing step has a higher concentration of NaOH and salt than the washing liquid in that washing step. The concentration of NaOH and salt in the ingoing tow is conveniently defined based on the liquid fraction of the tow, not including cellulose. The tow going out from a washing step has a lower concentration of NaOH and salt compared to the tow going into that step (again excluding cellulose) but still, the concentration of NaOH and salt in the outgoing tow is generally somewhat higher compared to the washing liquid except in the case where the tow has come to an equilibrium with the wash liquid in terms of interdiffusion of chemical species. The relative washing efficiency of the washing step under consideration can be described in terms of the NaOH and salt concentration in the outgoing tow in relation to the corresponding concentrations in the ingoing tow and the washing liquid that is in contact with the tow in the washing step under consideration.

It is clear that the washing efficiency depends on a multitude of factors that can be affected by the design of the washing unit and the process conditions applied. Temperature, residence time of the fiber tow in contact with the wash liquid, mechanically and/or hydraulically induced convective flow of washing liquid within the tow and the thickness of the fiber tow are examples of such factors, just to mention a few.

According to one embodiment, the alkali content, calculated as ppm by weight of NaOH, in the produced fiber tow is lowered gradually during the washing procedure to less than 50 ppm wt NaOH, calculated on dry fiber tow.

According to yet another embodiment, the coagulation bath comprises sodium hydroxide and sodium carbonate or sodium sulfate, preferably said coagulation bath comprises 3-10 wt. % sodium hydroxide, preferably said coagulation bath comprising 10-28 wt. % sodium carbonate or sodium sulfate or a mixture thereof.

As mentioned in WO2015/000820, relating to alkali recycling in a cellulose spinning process, the coagulation bath suitably comprises sodium hydroxide and sodium carbonate. In line with this, also other additives are possible in the present process. Apart from sodium hydroxide added to the coagulation bath by the spinning dope, the coagulation liquid is composed in such manner that it is a poor solvent for cellulose, whereby new fibers are formed during release of sodium hydroxide into the bulk of the coagulation bath.

Sodium hydroxide is also suitably recovered. Moreover, according to one embodiment, sodium hydroxide recovered from the countercurrent washing steps, after concentration and optional purification, is at least partially recycled to form new spin dope.

The concentration of NaOH and salt in the coagulation bath are determined by the rate and composition of the ingoing spin dope, the rate of added salt and the entrainment of coagulation bath liquid with the fiber tow leaving the coagulation bath and the overflow (if any) of coagulation bath liquid (to recycling stream), in turn related to the entrainment of coagulation bath liquid with the fiber tow which depends on the squeezing force applied to the tow leaving the coagulation bath. The maximum solubility of salt in the coagulation bath is determined by the temperature and NaOH concentration.

Salts are important to drive the salting out process. As the salt concentration is higher in the coagulation bath liquid than in the cellulose spin dope composition, water will be drawn out from the spin dope jets exiting the spinneret capillaries. At the same time carbonate and/or sulfate ions will go into the dope jets (filaments). This also implies that the cellulose molecules are bound to each other and forms crystalline nanofibrils (precipitation of cellulose).

According to one embodiment, the alkaline aqueous solvent comprises 0.4-1.2 wt. % zinc (as Zn) and more preferably 0.6-0.9 wt. % zinc, calculated on the total weight of the cellulose spin dope composition. As should be understood the calculation is made on zinc, and not e.g. as zinc oxide, which gives other percentages. Since the spin dope contains Zn, Zn will also be found in the coagulation bath.

According to one embodiment, the cellulose spin dope composition comprises cellulose, cellulose carbamate or another derivative of cellulose in the range of 4-12 wt. %, preferably 5-10 wt. %, calculated on the total weight of the cellulose spin dope composition. According to one embodiment, the cellulose spin dope composition comprises cellulose in the range of 5-8 wt. %, or comprises cellulose carbamate in the range of 5-10 wt. % or mixtures thereof. It should, however, be noted that also other cellulose derivatives may be present in the spin dope including but not limited to cellulose ethers and cellulose esters. Additives may be present in the spin dope, such additives can for example be zinc compounds and/or various forms of urea. In embodiments wherein the spin dope comprises cellulose carbamate or urea the carbamate or urea will, at least partially, be hydrolyzed in the alkaline coagulation bath and in the following alkaline fiber washing steps. Therefore, according to one embodiment, the cellulose spin dope comprises urea or cellulose carbamate which at least partially is hydrolyzed in the coagulation bath and in the consecutive washing steps. Any ammonia formed from the hydrolysis of cellulose carbamate or urea can be collected and discharged from the spinning process.

Furthermore, and as mentioned above, according to one aspect the process is directed to a stretching procedure. According to one embodiment, stretching of the fiber tow is performed and controlled by regulating the speed at which the fiber tow travels from the coagulation bath and through the consecutive washing steps.

According to one embodiment, the speed of the fiber tow as of washing step 1 is substantially maintained constant or is gradually increasing in one or more following washing steps at least up to and including the washing step after which the hydroxide concentration of the fiber tow is lower than 0.3 wt. %. It should be noted that the expression "substantially" should in this regard be interpreted so that the method may involve short times when the speed may be decreased or at least not increased gradually.

According to the present invention stretching is performed during the counter-current washing procedure, i.e. between or within the different washing steps. Moreover, it should be noted that the stretching is also made between the coagulation bath and the first washing step. Alternatives and embodiments relating to where more stretching or less stretching is performed are further discussed below. Moreover, the preferred direction of the stretching in the process according to the present invention is to ensure a stretching of the fiber tow in at least a first part of the washing procedure, i.e. between the coagulation bath and first washing step and between and/or within the first and second washing steps. This is because a too low stretching in these steps would affect the fiber tow quality more than in later steps. It should, however, be noted that the process according to the present invention also covers alternatives with stretching along most of, or even the entire, washing procedure, i.e. between all washing steps, and also procedures where the tension is lowered in early stages during short phases or the like.

As disclosed above, the alkalinity is reduced in each washing step in the washing procedure according to the present invention. By gradually reducing the alkalinity of the fiber tow under maintained tension it has been found that the fiber orientation obtained by stretching the fiber tow remains high, meaning the fibers are oriented in the lengthwise direction of the fiber, and becomes a permanent feature of the fiber. In relation to stretching and the alkaline environment it may also be mentioned that the total stretch during the washing operation may be partitioned into several stretching steps at consecutively lower alkalinity.

Furthermore, according to yet another specific embodiment of the present invention, the stretching is controlled to a degree resulting in a total elongation in the range of 30-80%, preferably controlled to a degree resulting in the tensile strength of the produced fiber becoming at least 15 cN/tex. The expression "the stretching is controlled to a degree resulting in a total elongation in the range of 30-80%" means that the fiber tow has been stretched to be elongated so that the length has increased 30-80% when being compared to the original length of the fiber tow, i.e. before the start of the stretching.

According to one embodiment of the present invention, as hinted above, stretching of the fiber tow is performed between the coagulation bath and the first washing step and wherein the fiber tow is kept in a stretched condition during at least part of the process thereafter. It should be noted that the fiber tow may be kept in a stretched condition during one or several washing steps thereafter.

According to another embodiment of the present invention, stretching of the fiber tow is performed between the coagulation bath and the first washing step and wherein stretching is continued during at least two, more preferably at least three, consecutive washing steps, preferably said at least two consecutive washing steps during which stretching is continued being among the four washing steps being arranged immediately after the coagulation bath, preferably the portion of the total stretch being performed in the at least two washing steps being at least 25%, more preferably at least 40% of the total stretch. The percentages given above refer to the share in relation to the total stretch, i.e. given in percentages of a total elongation length.

According to yet another embodiment, stretching of the fiber tow is performed so that a stretched condition is maintained during at least 50% of the washing procedure, preferably during at least the first 50% of the washing procedure, preferably the fiber is stretched to become elongated at least between the coagulation bath and the first washing step and in at least one consecutive washing step. In relation to the above, the expression "a stretched condition" means a condition in which the fiber tow is either stretched to be elongated or at least the fiber tow is kept at a tension sufficient for the fiber tow to be kept in status quo length so that any substantial slacking is avoided. Based on the above explanation it should be noted that the expression "a stretched condition is maintained during at least 50% of the washing procedure" may also be interpreted so that "any substantial slack in the fiber tow is avoided during at least 50% of the washing procedure", i.e. "a stretched condition" with regard to the fiber tow means: avoiding slacking in the fiber tow and/or stretching the fiber tow for obtaining elongation, the latter also resulting in avoiding slacking in the fiber tow. In line with the above, according to one embodiment a stretched condition, meaning that any substantial slack in the fiber tow is avoided, is maintained during at least 50% of the washing procedure, preferably the fiber tow is subjected to stretching for elongation in at least two positions, of which a first position being between the coagulation bath and the first washing step and a second position being in at least one consecutive washing step, still more preferably said second position of stretching for elongation being inside the first washing step or between the first and second washing steps.

Moreover, and as mentioned above, according to the embodiment above, such a condition is maintained during at least 50% of the washing procedure, preferably during at least the first 50% of the washing procedure. In this context the percentage relates to the share of the total number of washing steps. Furthermore, and as said, preferably the fiber tow is stretched to be elongated in early steps of the washing procedure, such as between the coagulation bath and the first washing bath or step and between and/or within, e.g. the first and second washing steps. When sodium hydroxide (NaOH) is washed out from the fiber tow, the cellulose nanofibrils are bound to each other and relaxation or recoil of stretched fibrils is prevented. As such it is important that the fiber tow is not slacked in at least early steps of the washing procedure, such as in the step from the first washing step to the second washing step and in between the second and the third washing step, and preferably not up to the washing step in which the NaOH concentration is still higher than 0.3 wt. %.

According to one embodiment of the present invention, stretching for elongation of the fiber tow is performed between the coagulation bath and the first washing step at a certain degree of elongation, wherein stretching is continued during at least three consecutive washing steps, preferably wherein the added degree of elongation in each step is lower than the added degree of elongation in the step between the coagulation bath and the first washing step, more preferably wherein the added degree of elongation decreases in each consecutive step. This embodiment implies that stretching for elongation is performed between the coagulation bath and the first washing step (bath), preferably that out of the total stretch for elongation then the highest share of elongation is performed in this first step between the coagulation bath and the first washing step. According to yet another embodiment of the present invention, the largest part of the total stretch for elongation of the produced fiber tow is performed in a stretching step between the coagulation bath and the first washing step of the washing procedure, when comparing the elongation of the stretching step between the coagulation bath and the first washing step to the elongation of other individual stretching steps between and/or within washing steps of the washing procedure, preferably at least 40% of the total elongation is performed between the coagulation bath and the first washing step of the washing procedure.

It should be noted that in the process according to the present invention, the greatest share of the total stretch for elongation does not have to be performed between the coagulation bath and the first washing step (bath). As an example, according to one embodiment of the present invention, the greatest share of the elongation is performed between the first and the second washing steps. Therefore, according to one embodiment of the present invention, the largest part of the total stretch for elongation of the produced fiber tow is performed in a stretching step between the first and the second washing step and/or within the first or the second washing step. Also in this embodiment it is preferred that a comparatively large share of the total stretch for elongation is performed between the coagulation bath and the first washing step, even if the largest share is performed in the consecutive step, i.e. between the first and second washing steps.

According to yet another embodiment of the present invention, stretching for elongation of the fiber tow is performed between the coagulation bath and the first washing step at a certain degree of stretching, preferably stretching for elongation is continued during at least three consecutive washing steps, still more preferably the stretching for elongation is continued between and/or within those at least three consecutive washing steps at a total degree of elongation being in the range of 0.7 to 1.2 times the elongation being performed between the coagulation bath and the first washing step. In relation to the above it should be noted that the expression "in the range of 0.7 to 1.2 times" refers to the total elongation in the three consecutive steps when added together, and not each step thereof individually.

Furthermore, it should be noted that all of the stretching for elongation may be performed between the coagulation bath and the first washing step together with within or between the first or the second washing step, e.g. all of the stretching for elongation may be performed between the coagulation bath and the first washing step together with within the first washing step or between the first and the second washing step.

Along the washing line, and as shown in FIG. 1, there are rollers or so-called godets arranged. The stretching for elongation, or the avoidance of slacking in the tow, as the case may be, may be controlled by controlling the speed of godets or rollers. This may also be the case when controlling the stretching for elongation in the process according to the present invention. Therefore, according to one embodiment, the stretching for elongation and/or the avoidance of slacking in the tow in each respective washing step is controlled by controlling the speed of a respective godet pulling the fiber tow through that washing step. Hence, individual speed regulation of godet 1 to n is also important to avoid possible slack in the fiber tow or to reduce unwanted tension along the tow due to possible shrinkage when washing out chemicals from the tow.

There are other possible technologies to accomplish control of the stretching for elongation and/or the avoidance of slacking in the fiber tow and these are also possible to use according to the present invention.

Furthermore, and as hinted above, one aspect of the process is directed to an optimal processing of zinc in the spinning in an alkaline coagulation bath, preferably with subsequent counter-current washing. In line with this, according to one embodiment, the alkalinity is reduced in the fiber tow gradually during the washing procedure and wherein zinc diffuses out from the fiber tow and into the washing liquid during the washing procedure, said washing procedure preferably being a counter-current flow washing procedure. It is, however, of interest to prevent the alkalinity (concentration of sodium hydroxide) to decrease too abruptly as this may cause zinc to precipitate within the fibers constituting the fiber tow.

According to one embodiment, zinc diffuses out from the fiber tow and precipitates in the washing liquid in the form of Zn-containing particles in at least one downstream washing step, wherein the washing liquid is suspended to keep the precipitated zinc dispersed in the washing liquid, and wherein the precipitated zinc is transported together with the washing liquid to at least one upstream washing step in dispersion without settling. An upstream washing step implies a washing step of a lower washing step number as it is an opposite direction of the moving fiber tow. Normally it is in washing steps number 4 to 6 that zinc precipitation in the washing liquid may be seen. Moreover, it may also be mentioned that suspension of the washing liquid to keep the precipitated zinc dispersed in the washing liquid may be accomplished by different means, such as by use of a circulating pump or an agitator.

Zinc normally starts precipitating (in the form of zinc hydroxide) when the NaOH concentration approaches about 2 wt. % in the washing liquid. The fiber tow brings along zinc particles to the subsequent step. At the same time zinc particles are transported with the washing liquid the other way. This implies that zinc particles are visible in a few washing steps around, meaning upstream and downstream, that washing step where NaOH concentration is about 2 wt. %. In line with this, according to the present invention the alkalinity is reduced gradually enough to allow zinc to be washed out from the fibers without precipitating inside the fibers in the form of zinc containing particles. Furthermore, at least the three (3) first washing steps preferably have an alkalinity or sodium hydroxide concentration of at least 2 wt. %. As such, zinc does not crystalize inside of the fiber and at the same time some parts of the zinc leaving the fiber tow precipitates in the liquid of the subsequent washing steps. As such washing liquid containing precipitated zinc particles may be transported to upstream washing steps with higher alkalinity in which such solid zinc particles are dissolved into the solution again, i.e. at higher alkalinity levels. It should be pointed out that the NaOH concentration indicated above (about 2 wt. %) when precipitation of zinc hydroxide commence depends on the zinc concentration in the washing liquid. There is of course a certain solubility of zinc even at a NaOH concentration of about 2 wt. %. Precipitation occurs when the zinc concentration is higher than the solubility limit at a particular NaOH concentration. The limiting concentration of about 2 wt. % NaOH is valid for a spin dope prepared to contain about 7.5 wt. % NaOH and about 0.76 wt. % Zn based on the total weight of the spin dope. If the concentration of Zn in the spin dope is higher than about 0.76 wt. % it is expected that precipitation will start at a somewhat higher NaOH concentration than about 2 wt. %. If the concentration of Zn in the spin dope is lower than about 0.76 wt. % it is expected that precipitation will start at a somewhat lower NaOH concentration than about 2 wt. %.

According to yet another embodiment, the precipitated zinc following the counter-current washing flow is dissolved at increasing alkalinity of the washing liquid in at least one upstream washing step ("upstream" being with respect to the direction of the moving fiber tow, that is, in the direction of lower washing step number) and is at least partially recycled and reused in the step of dissolving cellulose pulp in a cold alkaline aqueous solvent to form a cellulose spin dope composition. This implies that there is a recycling of zinc which is accomplished by using the washing line as such in an effective way, i.e. without extra recycling loops or the like.

Moreover, according to yet another aspect, the process also comprises drying of the fiber tow. According to one embodiment, the washed and in other ways treated fiber tow in a wet condition is subjected to a drying operation in which the fiber tow is dried in an unconstrained fashion, substantially free from sharp bends, allowing free shrinkage without any tension in the fiber direction, to produce a washed and dried fiber tow. The expression "substantially free from sharp bends" implies that the wet fiber tow is dried when it is not wrinkled. It should be noted that the fiber tow may be bent in smooth curves as long as no sharp angles are arranged along the fiber tow, where preferably the radius of any bending is larger than 10 mm.

Furthermore, according to yet another embodiment, the process also comprises crimping of the fiber tow. Crimping may be performed before drying or after drying. Moreover, according to yet another embodiment, mechanical crimping is performed subsequent to the drying of the fiber tow. According to the present invention, by crimping a dry fiber tow, crinkled strong fibers may be obtained. Many different types of crimpers may be used, for instance mechanical ones, e.g. a stuffer box crimper. It should, however, be noted that the process instead may comprise crimping of a semi-wet fiber tow, i.e. the fiber is crimped before it is being dried in full.

According to yet another embodiment, the process comprises cutting the dried and optionally crimped fiber tow into staple fibers. Hence, according to this embodiment the tow is first dried and thereafter cut, optionally the fiber tow is also crimped before being cut into staple fibers.

There are also other steps which may be part of the process. According to one embodiment, the fiber tow is treated with an acid in an acid treatment step subsequently to the last washing step in the washing procedure. Different acids may be used, one example is weak acids, e.g. carbonic acid in water. Also the intended pH value may be different. The acid treatment step is performed as a neutralization, which also may provide a stronger fiber. Also after this step it may be possible to include yet another washing step.

According to another embodiment, the fiber tow is treated with a bleaching agent in a treatment step subsequently to the last washing step in the washing procedure.

According to yet another embodiment, one or more surface active agents are supplied during the process to decrease cohesive forces between single filaments in the fiber tow, wherein said one or more surface active agents preferably are supplied to the fiber tow subsequently to the washing procedure, preferably subsequent to a possible acid treatment step and bleaching step and preferably before the drying procedure. The supply of one or more surface active agents is normally made in a so called avivage bath. The supply of surface active agents can also be made by spraying or sprinkling the fiber tow or by the use of kiss rollers.

The present invention also refers to a spinning line unit for forming a fiber tow, said spinning line unit comprising:

a dissolver unit (e.g. according to EP3231899A1) arranged for dissolution of cellulose pulp in an alkaline aqueous solvent, preferably in a cold alkaline aqueous solvent at a temperature of 0° C. or lower, to form a cellulose spin dope composition;

a spinning unit arranged for spinning the cellulose spin dope composition in an alkaline aqueous coagulation bath having a pH of more than 7.0 to produce a fiber tow; and a washing line, preferably a counter-current flow washing line, comprising several washing units arranged in sequence for washing of the produced fiber tow in consecutively lower alkalinity. As hinted above, the washing line is preferably operated according to the counter current flow washing principle.

It should also be stated that all embodiments and alternatives mentioned above in relation to the process according to the present invention are also possible embodiments in relation to the spinning line unit according to the invention. This implies that different steps may be rewritten as units arranged for performing these steps.

Below, some embodiments are presented relating to the spinning line unit. According to one such embodiment, the washing line comprises at least five washing units, preferably at least seven washing units. According to yet another embodiment, the spinning line unit also comprises one or more stretch control units, preferably at least for control of the stretching for elongation of the fiber tow between the coagulation bath and the first washing unit, more preferably for controlling the stretching for elongation of the fiber tow also between and/or within several of the washing steps.

Furthermore, according to another embodiment, the spinning line unit comprises a fiber tow drying unit adapted to perform a drying operation in which the fiber tow is dried in an unconstrained fashion, substantially free from sharp bends, allowing free shrinkage without any tension in the fiber direction, for the production of a washed and dried fiber tow, preferably the spinning line unit comprises a crimping unit for crimping the washed fiber tow, still more preferably the spinning line unit further comprises a fiber cutting unit for cutting the washed and dried fiber tow into staple fibers. Moreover, the spinning line unit may also comprise means for enabling zinc to diffuse out from the fiber tow and precipitate in a washing liquid, and for precipitated zinc to follow the, preferably counter-current flow, washing line in an upstream direction, "upstream" being with respect to the travel direction of the fiber tow, for recycling and reuse of zinc in the dissolver unit.

BRIEF DESCRIPTION OF THE DRAWINGS

FIG. 1 B illustrates a spinning line according to a second embodiment.

FIG. 4b illustrate the composition of the washing liquids of the spinning line referred to in FIG. 4a.

FIG. 6a is a micrograph of a fiber cross section of a fiber washed in pure water.

FIG. 6b is a micrograph of a fiber cross section of a fiber washed gradually with consecutively lower alkalinity.

FIG. 7 illustrates a trial set-up for testing fiber adhesion.

FIG. 8 is a photograph of fibers washed with gradually decreasing alkalinity, to the right in FIG. 8 and marked with a "B", and fibers immediately washed with pure water, to the left in FIG. 8 and marked with "BW".

FIG. 9a is a photograph showing to the left: fibers dried as fiber tow in unconstrained manner and free from sharp bends, and to the right: staple fibers dried in randomly wrinkled state.

FIG. 9b illustrates the strengths of the fibers of FIG. 9a.

EXAMPLES AND DETAILED DESCRIPTION OF THE DRAWINGS

Figure 1:
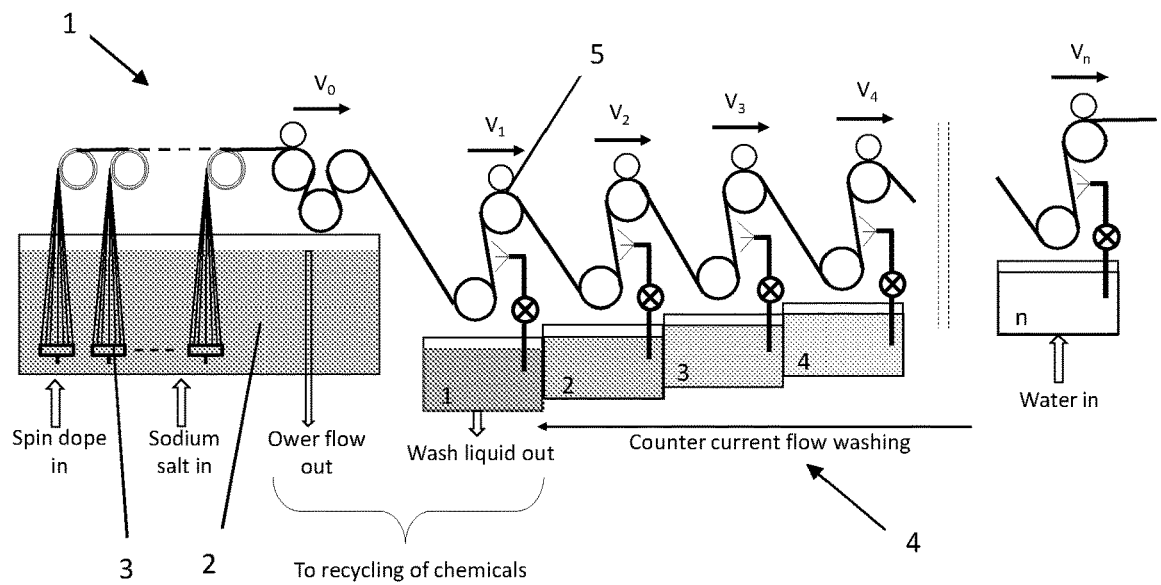
FIG. 1 A illustrates a spinning line according to a first embodiment.

In FIG. 1A there is shown part of a spinning line 1 according to a first embodiment. In this case the coagulation bath 2 comprises at least three spinning positions or spinning heads 3. Each spinning head 3 comprises a plurality of spinnerets and each spinneret comprises a plurality of capillaries. The fiber tows from the spinning heads/positions are combined, side by side, into a flat common fiber tow. The produced fiber tow is led into the washing procedure 4, preferably operated according to the counter current flow principle. As depicted in FIG. 1A there may be up to a number of n washing steps, where n may be at least 5, preferably at least 7, and up to 10 or above 10. Vn refers to the speed of the tow over each godet 5 in each specific washing step. In the washing procedure water is flown into the final washing step. The washing liquid is then led through each washing step in a counter-current flow when comparing with the fiber tow. The washing liquid led out from the first washing step (as numbered with reference to the processing of the fiber tow) has a higher alkalinity. As notable in FIG. 1A, in each respective washing step the fiber tow, still in a condition of tension, is contacted with the washing liquid in each respective washing step by means of a pump driven wash bath liquid circulation flow, sprinkling or spraying wash bath liquid onto the fiber tow. Press rollers are applied to the outgoing tow from each washing step to reduce the amount of wash liquid entrained (carried over) by the tow from one washing step into the next washing step.

In FIG. 1B there is shown another embodiment. As notable in FIG. 1B, in each washing step the fiber tow, still in a condition of tension, meaning the fiber tow is either experiencing stretching for elongation, or is at least not slacking, is led down into the washing bath and then up from the bath and led into the next washing bath. Press rollers are applied to the outgoing tow from each washing step to reduce the amount of washing liquid entrained by the tow from one washing step into the next washing step.

Figure 2:
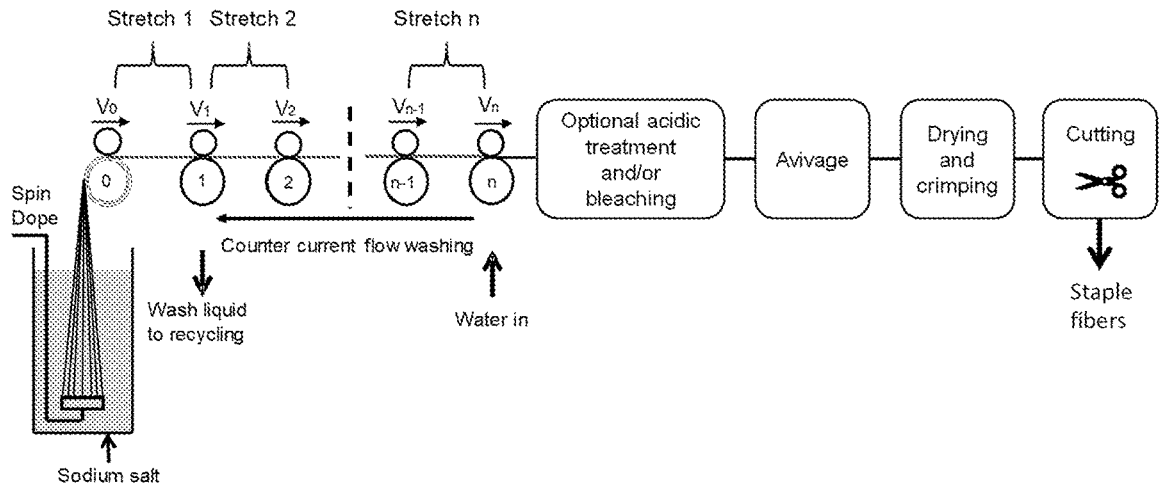
FIG. 2 illustrates a spinning line according to a further embodiment.

In FIG. 2 there is shown a schematic view of a spinning line according to still another embodiment. As notable, in this case the coagulation bath comprises one spinning head. From the spin dope led into the coagulation bath a fiber tow is produced. The spun fiber tow is then led to a countercurrent washing procedure which functions as disclosed above. Between some, or even between each, washing step, and also between the coagulation bath and the first washing step, a stretching for elongation is performed. As mentioned above, the stretching for elongation may be performed in different ways and with different magnitude in the different steps. Subsequent to the last washing step, an avivage step may be arranged, in which step surface active agents are added to the fiber tow. The tow may pass an avivage bath or being sprayed or receiving the agents by means of a kiss roll or in some other way. Thereafter, drying may be performed, then crimping and finally cutting of the produced fiber. Crimping may also be performed before drying or in a semi dry state (not indicated in FIG. 2). It should be noted that also other steps may be involved, such as an acid addition step arranged directly after the final washing step and/or a bleaching step.

In the processes shown in FIGS. 1 and 2, the spin or coagulation bath liquid may contain water, sodium carbonate ($Na_2CO_3$) or sodium sulfate ($Na_2SO_4$) or a mixture thereof, sodium hydroxide (NaOH) and a minor amount of zinc containing salts. When the thin (e.g. from 50 to 70 μm in diameter) dope jets extruded from the spinneret capillaries come into contact with the spin bath liquid, water and some hydroxyl ions is diffusing out from the jets while sodium and carbonate ions, and/or sulfate ions in case of sodium sulfate being present in the spin bath, diffuses into the jets due to the differences in osmotic pressure (concentration differences). Due to the change in chemical composition within the dope jets cellulose does not stay in solution any longer and precipitates in the form of a more or less oriented network of nanofibrils. To which extent the nanofibrils are oriented, parallel with the longitudinal direction of the fiber, depends on the design of the spinneret capillaries and the draft ratio applied in the coagulation bath, that is, on the ratio $V_0/V_{exit}$. $V_0$ is the speed of the tow exiting the coagulation bath and $V_{exit}$ being the exit speed of the dope jets from the spinneret capillaries (volumetric flow rate of dope divided by the total capillary cross-sectional area). By the coagulation process the liquid jets leaving the spinneret capillaries are transformed into soft and highly swollen gel filaments that are drawn upwards through the spin bath by means of a godet roller and by the action of buoyancy. The coagulation process is thus very different to the viscose process where the spin or coagulation bath contains sulfuric acid ($H_2SO_4$). In the viscose process the sodium hydroxide in the spin dope is neutralized by the acid. The cellulose precipitates very quickly and form rather compact and solid filaments instantaneously at the spinneret exit. This also means that most of the water in the spin dope (dope contains about 85% water) end up in the acidic bath and that only about 120 wt. % spin bath liquid based on dry cellulose is entrained with the fiber tow from the spin bath. For the process according to the present invention, coagulating the dope jets into an alkaline spin bath, the corresponding figure may exceed 1000 wt. % spin bath.

In the process, sodium carbonate and/or sodium sulfate is picked up by the filaments. At the same time some water and hydroxyl ions from the spin dope is transferred to the coagulation bath liquid. It has been found that the coagulation bath level may slowly increase or decrease depending on how much spin bath liquid that is squeezed out from the tow at the godet roller and fed back into the spin bath. The press roller force is preferably adjusted so that the coagulation bath level stays constant or so that an over flow of coagulation bath liquid is obtained, see FIG. 1A. In this way only salt ($Na_2CO_3$ and/or $Na_2SO_4$) must be continuously fed to the coagulation bath to keep the salt concentration constant. It can be mentioned that if hydrated forms of sodium salt are fed to the coagulation bath, to keep the sodium salt ion concentration constant, the over flow will be higher. The concentration of NaOH and Zn in the coagulation bath will then be lower if not deliberately adjusted by adding NaOH and Zn to the coagulation bath.

Maximum stretching for elongation, and thus maximum fiber tenacity, is obtained by performing the stretching for elongation of the fiber tow when the fiber tow is in an alkaline state, having a relatively high content of sodium hydroxide. Such stretching for elongation makes the nanofibrils orient themselves in the longitudinal direction of the fiber. However, if the fibers are not maintained in a stretched state, such "stretched state" meaning the fibers are being further elongated, or at least kept at such a tension that there is no substantial slacking of the fiber tow, under further reduction of alkalinity the induced orientation will relax to a certain degree, thereby reducing the fiber tenacity.

Figure 3A:
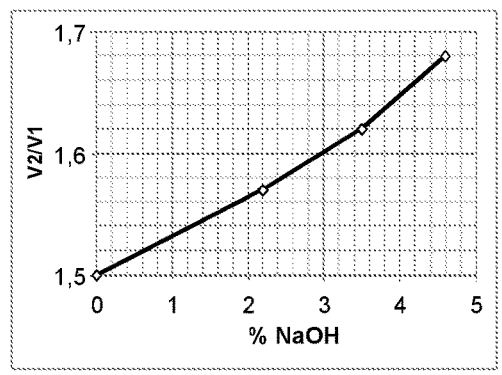
FIGS. 3a and 3b illustrate stretching of tow at different alkalinity.
Figure 3B:
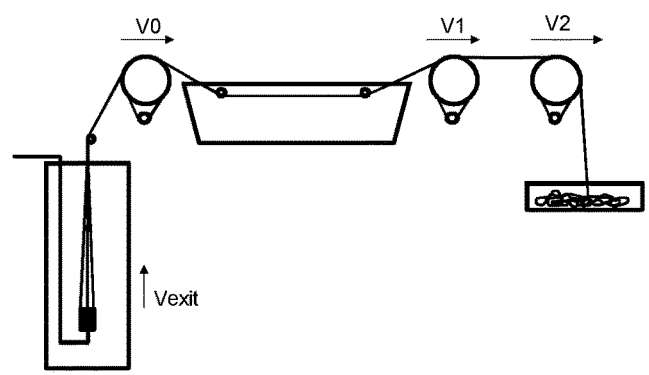

To obtain fibers with high tenacity the tow is stretched for elongation between godet 0 and 1 (speed of godet 1 is suitably higher than that of godet 0, see FIG. 2). The stretching for elongation is assumed to orient the nanofibrillar cellulose structure in the direction of (along) the fiber tow. It has been found that the tow is more stretchable if the alkalinity of the tow is high (high amount of NaOH in the tow), as it is between godet 0 and 1 (FIG. 2) for instance. This is illustrated in FIGS. 3a and 3b showing bench scale stretching of tow with different alkalinity. The coagulation bath held at 28° C. contained 20 wt. % sodium carbonate, 5.6 wt. % NaOH and 0.56 wt. % Zn and the speed of godets 0 (V0) and 1 (V1) was the same as the extrusion speed ($V_{exit}$) from the spinneret. The spin dope used contained 6 wt. % cellulose, 7.5 wt. % NaOH and 0.76 wt. % Zn and was extruded through a spinneret having 300 capillaries with the diameter 55 μm. The fiber tow was stretched between godet 1 and 2 (V2>V1) after passing a bath in which the concentration of NaOH was adjusted to 0, 2.2, 3.5 and 4.6 wt. %. FIG. 3a shows that the maximum possible stretch ratio (V2/V1), before the fiber tow breaks, increases with wt. % NaOH in the bath preceding the stretching for elongation. It has, however, been found that if the stretched tow is cut to staple fibers at this stage (directly after godet 2), meaning that the tension in the fibers is released, the orientation of the nanofibrils is lost to a large extent, resulting in less strong fibers. By gradually reducing the alkalinity of the fiber tow under maintained tension, meaning that any slacking in the fiber tow is substantially avoided, it has been found that the fiber orientation remains high and becomes a permanent feature of fiber. A possible explanation is that nanofibrils are gradually coming closer to each other (decreased swelling) and become bonded to each other by the formation of hydrogen bonds as the alkalinity is gradually decreased in the consecutive washing steps (1–n).

Figure 4A:
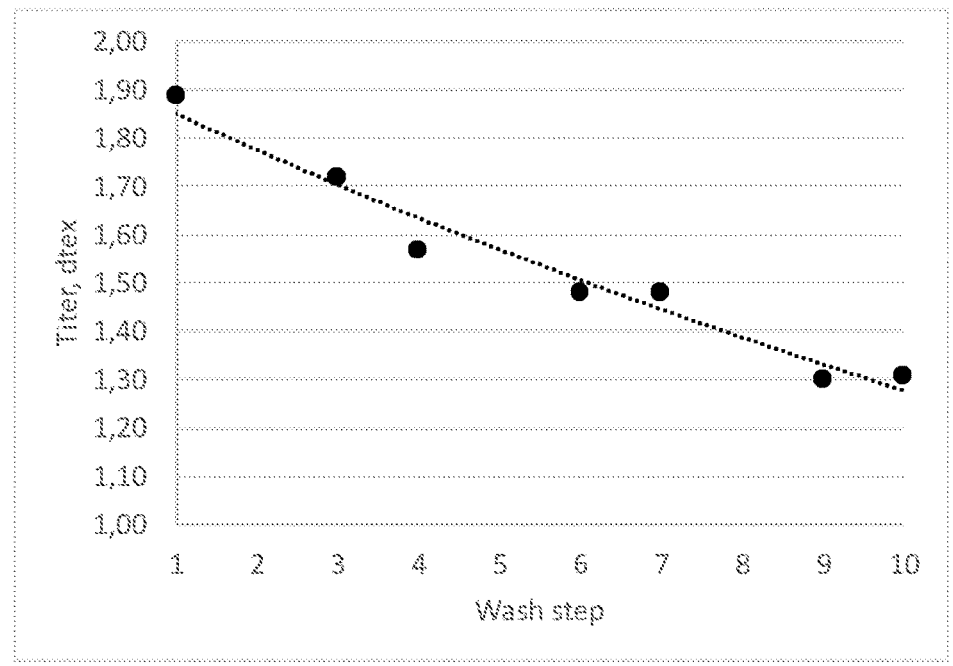
FIG. 4a illustrate titer of fibers sampled at different locations along a spinning line.
Figure 4B:
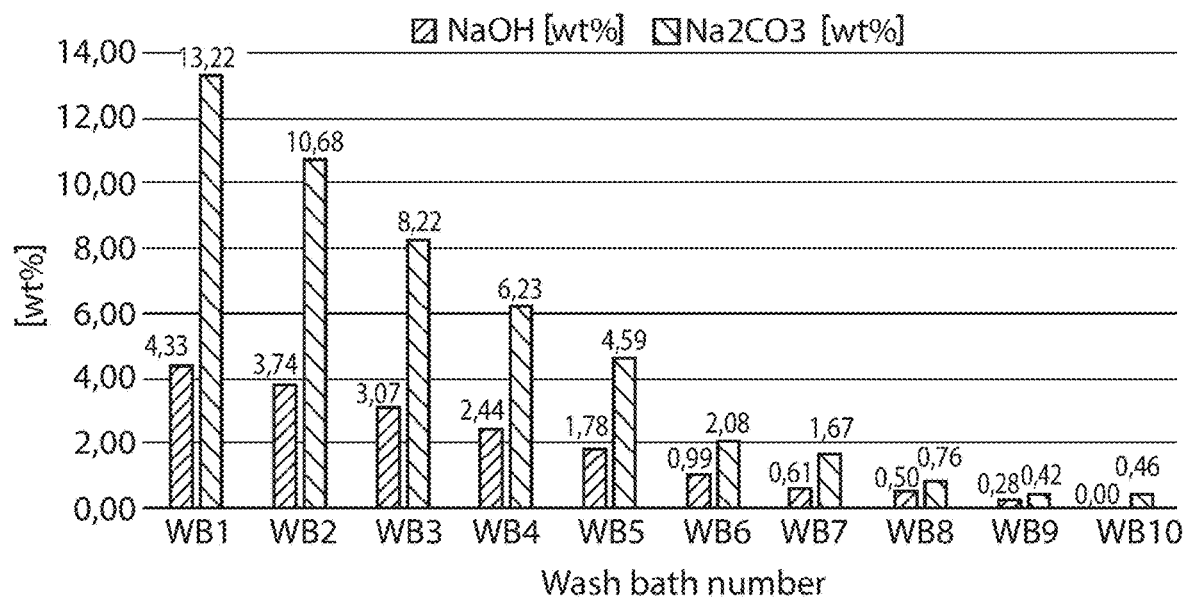

To provide one example, tow samples were taken at different positions along the spinning line. The washing unit was designed according to FIG. 1A with 10 washing steps (n=10). The number of capillaries in the spinning head was 13500 (capillary diameter was 55 μm). The spin bath was operated at 29° C. and contained 18 wt. % sodium carbonate, 5.3 wt. % sodium hydroxide and 0.5 wt. % Zn. The spin dope used contained 6 wt. % cellulose, 7.5 wt. % NaOH and 0.76 wt. % Zn. The wash water flow rate to spin dope flow rate ratio was unity (Qw/Qd=1) and the ingoing wash water temperature was 20° C. The stretch ratio V1/V0 was 1.4. The speed of the godets 2 to 10 were kept constant and equal to the speed of godet 1, that is, V1=V2=V3=V4=V5=V6=V7=V8=V9=V10. Tow samples were taken directly after godets 1, 3, 4, 6, 7, 9, and 10, see FIG. 1A and FIG. 2, and were further washed freely in water. After drying the tow samples freely in air, the titer (dtex) was measured on single fibers extracted from the tow samples. FIG. 4a show the measured titer variation while FIG. 4b show the concentration of NaOH and Na2CO3 in the relevant wash liquids. The theoretically calculated fiber titer based on the spinning conditions used and assuming zero relaxation was 1.30 dtex. From the graphs in FIGS. 4a and 4b it can be concluded that in order to completely avoid relaxation of the orientation induced by stretching between godet 0 and godet 1, and thus to obtain a final fiber titer of 1.3 dtex, the fiber tow should be kept under tension (not slacked) at least up to the washing step in which the wash liquid has a NaOH concentration of about 0.3 wt. %.

Regarding partitioning of the stretching for elongation over the counter-current washing process, the individual speed regulation of the godet rollers (0–n in FIG. 2) may be seen as important for several reasons: 1) differentiated stretching for elongation along the washing sequence may be used to optimize fiber properties (tenacity and elongation), 2) to avoid possible slack in the fiber tow, 3) to avoid unwanted high tension in the fiber tow due to shrinkage. Individual speed regulation thus ensures a close control of tow tension in (along) the washing process.

In one test trial fibers were spun according to FIG. 2 using 12 washing steps (n=12). The stretching for elongation was partitioned as shown in table 1 below.

TABLE 1

| V1/V0 | V3/V0 | V5/V0 | V7/V0 | Total stretch (%) | Tenacity (cN/tex) | Elong. (%) | Titer (dtex) |
|---|---|---|---|---|---|---|---|
| 1.400 | 1.414 | 1.428 | 1.457 | 45.7 | 16.9 | 9.0 | 1.3 |
| 1.200 | 1.296 | 1.387 | 1.456 | 45.6 | 18.9 | 10.2 | 1.3 |

Stretching was done in 4 steps as indicated in the table 1 to virtually the same total stretch. The alkalinity in the wash baths is shown in the FIG. 5.

Figure 5:
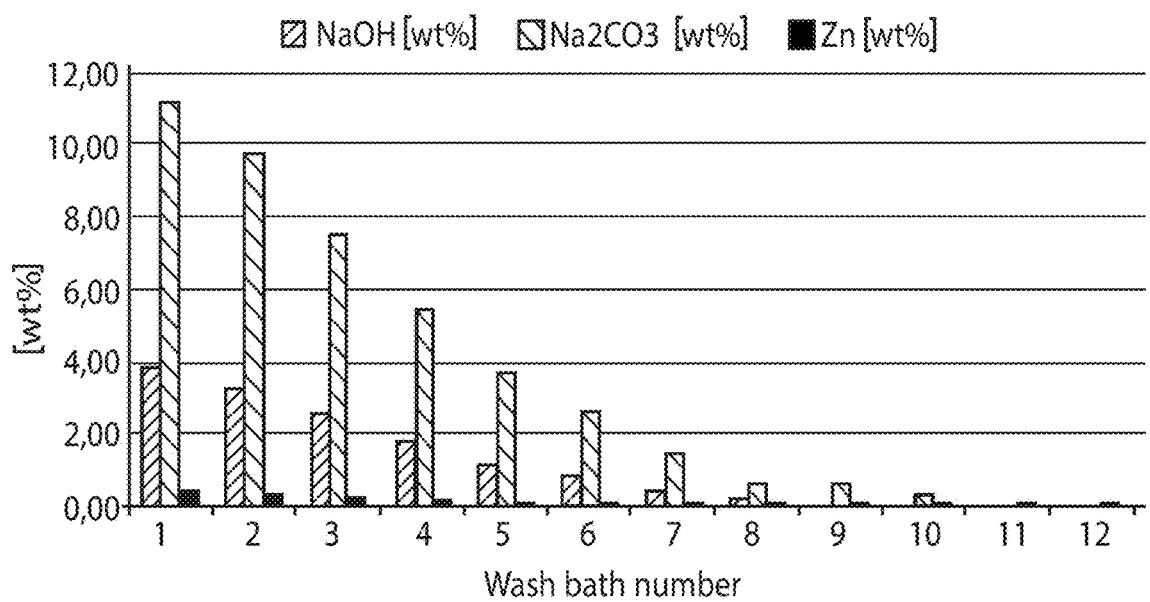
FIG. 5 illustrate the composition of the washing liquids in a test of stretching for elongation.

From the table 1 and the FIG. 5 it is seen that the final fiber properties can be affected by distributing the stretch so that stretching is performed at different alkalinity. In this case it is seen that fiber properties improves if a part of the stretching for elongation is performed at lower alkalinity.

With reference to the perspective of avoiding precipitation of zinc in fibers, it has been found that zinc can precipitate inside the fibers in the form of $Zn(OH)_2$ if alkalinity is not lowered in a gradual fashion during washing. Zinc may be harmful to the aquatic environment and should therefore be minimized in the final fiber. Important is also that zinc following the fiber is lost and cannot be recycled in the process thus generating extra cost.

In FIGS. 6a and 6b there are shown SEM micrographs of an ion polished fiber cross section of a fiber washed in pure water directly after the coagulation bath (FIG. 6a) and of a fiber washed gradually in several wash baths with consecutively lower alkalinity (FIG. 6b). In FIG. 6a there is seen numerous sub-micron particles of zinc hydroxide while the gradually washed fiber does not show any signs of precipitated particles (see FIG. 6b).

By using a washing principle in which the alkalinity is gradually lowered Zn is obviously following NaOH, without precipitating inside the fiber, and diffusing out from the fiber and into the wash liquid. It has been experimentally shown that the Zn/Na weight ratio is the same (about 0.1) in the outgoing wash liquid as it is in the spin dope when the wash principle of gradually decreasing alkalinity is used, showing that Zn stays in solution with NaOH and thus is completely washed out from the fibers. Then a Zn content lower than 50 mg/kg fiber may be obtained.

The possible precipitation of Zn inside the fibers thus seems to depend on the concentration gradient over the washing machine/unit. The concentration gradient depends, among other things, on the following factors:

The ratio of wash water flow to spin dope flow

The number of washing steps

The amount of washing liquid that is entrained with the tow which depends on the force applied on the pressure rollers Since the fiber tow needs to be washed down to some maximum alkalinity the above factors are not independent. For instance, the ratio of washing water to spin dope has to be increased if the number of washing steps is reduced for the same wash efficiency and the number of washing steps or the washing water to spin dope ratio can be reduced if the force is increased on the pressure rollers (less wash liquid is entrained to the next washing step).

A problem might also be when Zn is precipitated in the form of zinc hydroxide particles in the wash liquid. Such particles may lead to sedimentation and possible clogging of the connection lines/pipes between the wash steps. By ensuring that the washing liquid is in enough motion (avoiding stagnant areas/zones) sedimentation may be avoided and the Zn particles will then follow the washing liquid flow to higher alkalinity wash steps where Zn is again dissolved. This implies that there is provided means to avoid extracting solid Zn particles from the washing liquid in downstream washing steps for recycling which could be an alternative. Furthermore, dilution of chemicals for economic recycling may also be minimized. Since the recycling of NaOH, Zn and sodium salt may involve energy intensive processes, such as evaporation of water from the washing liquid, the degree of dilution is relevant for process economy. The wash water flow rate to spin dope flow rate ratio (Qw/Qd) should thus be minimized. Counter-current flow washing is in this respect a very efficient process. Qw/Qd is decreasing with increasing number (n) of wash steps. Qw/Qd is also decreasing with decreasing entrainment of washing liquid between the washing steps which in turn depends on the squeezing force of the pressure rollers (see FIG. 2). Process complexity and investment cost increase with n. Pressure roller force can be high downstream in the washing process where alkalinity is low. Pressure roller force upstream in the washing process, where alkalinity is high and the fibers are still soft and swollen, has to be lower to avoid damaging the fibers/tow. In FIG. 4 there is presented one example with n=12 and Qw/Qd=1. In this case the pressure roller force was low in the first 3 washing steps and then gradually increased in step 4 to 12 to be about 10 times higher in step 12 compared to step 1.

Moreover, with reference to avoiding fiber to fiber adhesion during washing out chemicals it has, according to the present invention, been found that fiber to fiber adhesion can be a problem if the alkalinity of the tow is reduced abruptly by washing at the same time as the tow is under tension, meaning not in a slacking condition. By using countercurrent flow washing in which alkalinity is reduced gradually, fiber to fiber adhesion is eliminated or at least minimized.

One trial set-up is presented in FIG. 7. Bundles of tow (about 20 tows in a bundle) was gathered after V1 according to FIG. 7 and were washed in wash baths 1-5 with gradually decreasing alkalinity according to table 2 below.

TABLE 2

| Bath # | 1 | 2 | 3 | 4 | 5 |
|---|---|---|---|---|---|
| Na$_2$CO$_3$, wt. % | 17.6 | 7.04 | 1.76 | 0.44 | 0 |
| NaOH wt. % | 5.4 | 2.16 | 0.54 | 0.135 | 0 |

Samples marked BW in FIG. 8 were directly transferred to wash bath #5 (pure water). Samples marked B in FIG. 8 were first transferred to bath #1 and then to baths #2-5 in turn.

It may be seen that the individual fiber tows in the bundles are clearly discernible in the samples marked BW to the left while individual tows are hardly discernible in the samples to the right marked B showing that fiber to fiber adhesion can be avoided to a large extent by gradually washing out the chemicals from the tow.

The process according to the present invention also presents means for avoiding weak fibers due to dried-in wrinkles by drying fiber tow instead of staple fibers. The regeneration of fibers from directly dissolved cellulose produce stiff and somewhat brittle fibers (both dry and wet moduli are higher than for conventional viscose fibers) due to high crystallinity. High fiber stiffness is assumed to be positive for dimensional stability of garments during washing. However, such fibers are susceptible to dried-in wrinkles forming stress concentrations upon unfolding and stretching. Weak spots along the staple fibers produce lower tenacity, fiber shortening and dust generation during carding/sliver formation/yarn spinning.

It has now been found that stress concentrations leading to a weakening of fibers due to dried-in wrinkles can be avoided if the fibers are dried in tow form before being cut to staple fibers.

Several repeated experiments performed show that drying randomly wrinkled fibers, like in the conventional viscose process, produce a reduction in fiber strength compared to unconstrained drying (i.e. under zero tension) of fiber tow substantially free from sharp bends. FIG. 9a shows, to the left: fibers dried as fiber tow in unconstrained manner and substantially free from sharp bends, and to the right: staple fibers dried in randomly wrinkled state. In FIG. 9b there is shown tenacity (strength) in cN/tex of fibers dried in an unconstrained fashion, substantially free from sharp bends, referred to in FIG. 9b as "Free drying of straight tow", compared to staple fibers dried in a randomly wrinkled state. As illustrated, the fibers dried as a fiber tow in an unconstrained fashion, substantially free from sharp bends, have consistently higher strength than the fibers dried as staple fibers in randomly wrinkled state.

Figure 10:
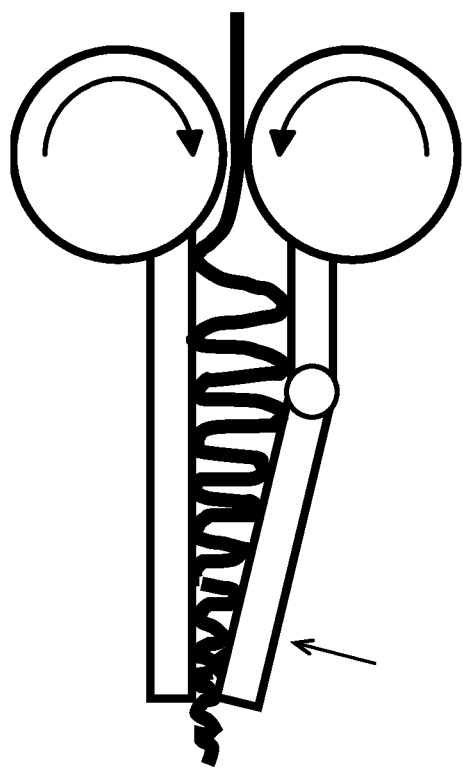
FIG. 10 illustrates schematically mechanical crimping using a stuffer box crimper.

Moreover, there is also provided means for mechanical crimping without inducing fiber weaknesses. Dried-in wrinkles may be avoided by drying tow as described above. However, straight fibers without crimp are difficult to handle in downstream operations like carding and sliver manufacture due poor web cohesion since straight fibers are less prone to entangle with each other compared to curly/crimped fibers. It has now been found that mechanical crimping using e.g. a stuffer box crimper (see schematic view with crimping principle in FIG. 10) of the dried tow before cutting to staple fibers could be a remedy.

It has been found that a fiber tow that is dried in an unconstrained state, that is, under no tension during drying; allowing free shrinkage of the tow in the longitudinal direction/fiber direction during drying, produce crimped fibers with maintained strength.

Figure 11A:
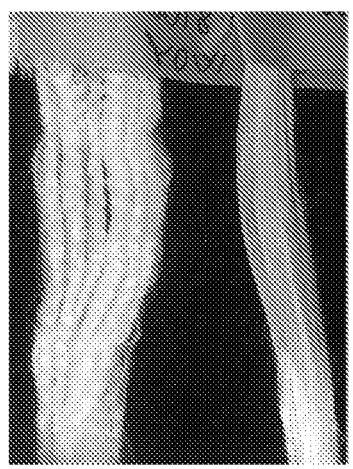
FIG. 11a is a picture of a dried fiber tow before crimping (to the right) and after crimping (to the left).
Figure 11B:
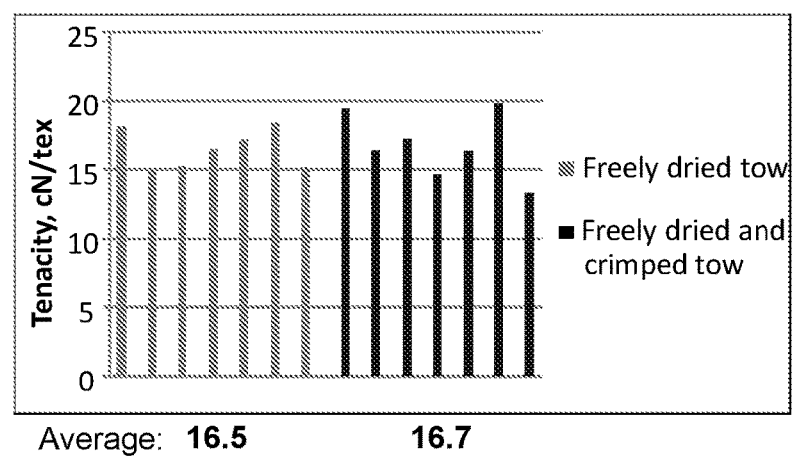
FIG. 11b illustrates the strength of fiber tows before and after mechanical crimping.

Several repeated experiments performed show that fiber tow dried in unconstrained manner and substantially without sharp bends, referred to as "Freely dried tow" in FIG. 11b, maintains mechanical properties after crimping, see FIGS. 11a and 11b for comparison of tenacity of un-crimped and crimped tow. In FIG. 11a the right sample is a dried fiber tow before crimping, and the left sample is a dried fiber tow that has been exposed to mechanical crimping by means of a stuffer box, such as the one illustrated in FIG. 10. In FIG. 11b the strength (tenacity) in cN/tex of a number of fiber tow samples that have not been crimped, the left bars in FIG. 11b, are compared to a number of fiber tow samples that have been exposed to mechanical crimping, the right bars in FIG. 11b. As can be seen from FIG. 11b the tenacity is in principle the same before and after the mechanical crimping. The tests described with reference to FIGS. 9a and 9b clearly indicate that "dried-in kinks", formed during drying, produce weak spots along the fibers, while the tests of FIGS. 11a and 11b clearly indicate that rather sharp folds or bends created in the crimper on already dry fibers (10-20% humidity) do not produce any such weak spots.

Regarding crimping using a stuffer box crimper it has been found that the dry content of the tow entering the stuffer box cannot be too high, nor too low. The fibers become so stiff and brittle that they break in the stuffer box if the tow has a dry content approaching 100 wt % (very low humidity; as measured gravimetrically by weighing the wet sample before drying and then after drying in an oven at at least 100° C., such as around 105° C., and at least 1 hour, such as 2 hours or more, even up to 24 hours, and where the weight loss is assumed to be evaporated water). If the humidity of the tow is too high (low dry content) the fibers become so soft that the stuffer box become jammed. The best result and smooth processability is found if the dry content of the tow entering the stuffer box is in the range of 80-90 wt. %.

Moreover, the washing efficiency was also investigated in trials in which immersion was compared with spraying. The washing efficiency WE may be calculated as:

$$W_{E_{NaOH}} = \frac{NaOH_{IN} - NaOH_{OUT}}{NaOH_{IN} - NaOH_{WL}}$$

$$W_{E_{Na2CO3}} = \frac{Na2CO3_{IN} - Na2CO3_{OUT}}{Na2CO3_{IN} - Na2CO3_{WL}}$$

This corresponds to the difference in the NaOH concentration (or Na$_2$CO$_3$ concentration) between the input tow and the output tow divided by the difference in NaOH concentration (or Na$_2$CO$_3$ concentration) between the input tow and the washing liquid. In this context "input tow" implies the tow entering the washing step and "output tow" implies the tow exiting the washing step.

Figure 12:
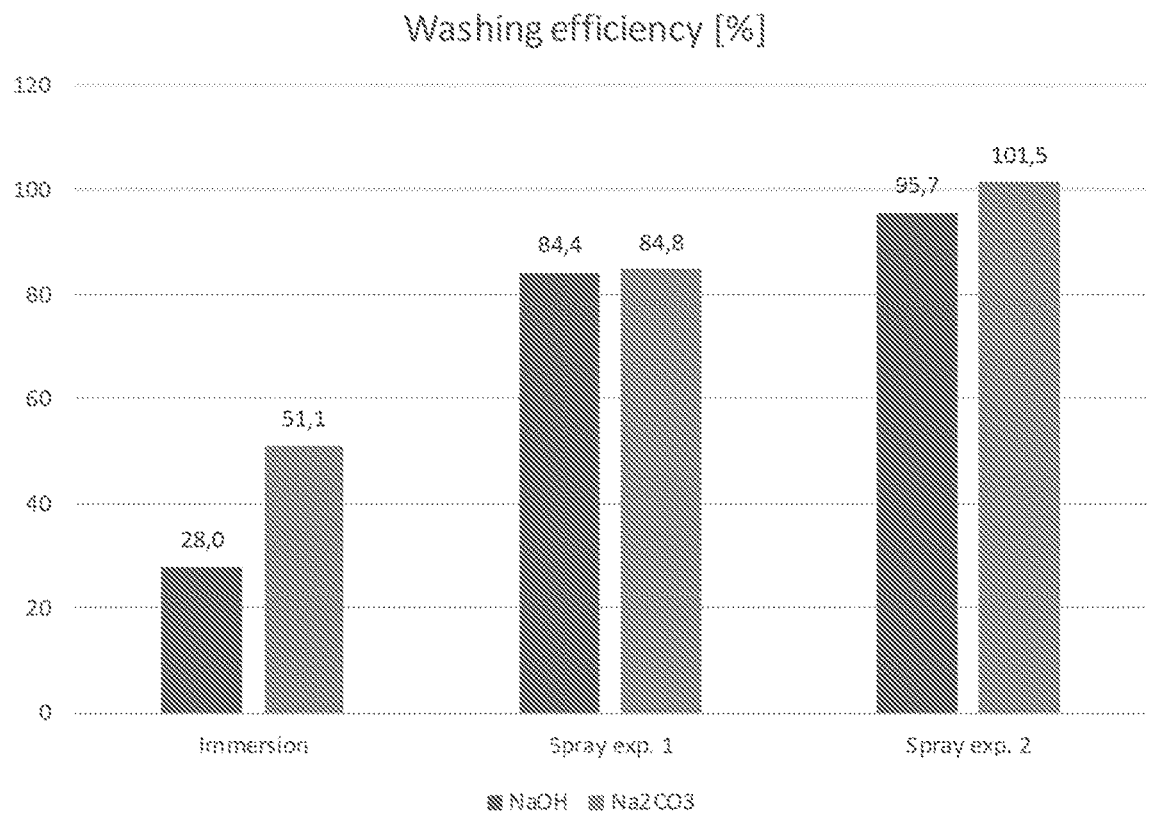
FIG. 12 shows the washing efficiency for trials made in which the washing technologies immersion and spraying are compared.

As notable in two different trial set-ups, presented in FIG. 12, spraying gave an enhanced washing efficiency when compared to immersion. In these trials the total fiber tow had 243,000 dtex (corresponding to 162,000 filament with a titer of 1.5 dtex). This fiber tow was limited to a width of 5 cm giving a theoretical tow thickness of 48,600 dtex/cm.

The total washing time was 20 seconds for all samples shown in FIG. 12. This time relates to the time during which the tow was immersed in the washing liquid in the immersion case, and the time during which the tow was exposed to the spraying flow in the spraying case, respectively. Moreover, the washing liquid flow was 10,600 kg/h at a spin dope flow of 328 kg/h (=19.7 kg/h dry fiber (cellulose)) in the spraying trial, corresponding to 10,600 kg/h/328 kg/h=32.3 kg washing liquid flow per kg spin dope composition. It should be noted that the given flows can be very different from the ones used in these trials, e.g. lower, but also higher. Furthermore, in the immersion trial a washing liquid volume of 650 liter was used, where said volume was recirculated with the same flow level as in the spraying trial. In the trial, comparatively high liquid flow levels have been used. Hence, lower levels are totally possible to use according to the present invention. Fact is, any type of flow levels may be used according to the present invention.

As notable, in comparative trials, the washing efficiency in spray washing is kept above 80%, e.g. as high as around 95%, which should be compared to immersion, which presented a washing efficiency at 28% and 51.1%, respectively. Based on these results, according to one embodiment of the present invention, at least one washing step is performed by spraying, preferably all washing steps are performed by spraying.

To summarize, the process and system disclosed herein provides various preferable means for solving several fiber quality/property and recycling issues. Some examples of such preferable means are summarized below.

1. Maximum stretching, and thus maximum fiber tenacity, is obtained by stretching the fiber/tow in an alkaline state (high concentration of NaOH in the tow). However, if the fibers are not maintained in a stretched state, meaning that slacking is substantially avoided, under further reduction of alkalinity (washing out NaOH and sodium salt) the induced orientation will relax to a certain degree.
2. The mechanical properties of fibers might positively be affected if the total stretching for elongation is partitioned into several steps at consecutively lower alkalinity. Individual speed regulation of godet 1 to n is also useful to avoid possible slack in the tow or to reduce unwanted tension along the tow due to possible shrinkage when washing out chemicals from the tow.
3. In order to achieve improved economy in recycling of chemicals the dilution of chemicals with water after the spin bath should be kept to a minimum.
4. A quick reduction of alkalinity in the swollen fibers while still being close together will induce unwanted fiber to fiber adhesion resulting in difficulties to separate fibers in downstream operations. Hence, it is preferable to avoid such quick reduction of alkalinity.
5. The coagulation of fibers from directly dissolved cellulose produces stiff and somewhat brittle fibers (both dry and wet moduli are higher than for conventional viscose fibers) due to high crystallinity. High fiber stiffness is assumed to be positive for dimensional stability of garments during washing. However, such fibers have been found to be susceptible to dried in wrinkles forming stress concentrations upon unfolding and stretching. Such wrinkles are easily formed if fibers are dried in a randomly wrinkled state as would be the case if conventional viscose technology were to be applied (washing and drying of fibers cut to staples). Weak spots along the staple fibers produce lower tenacity, fiber shortening and dust generation during carding/sliver formation/yarn spinning. By drying the fibers in the form of a fiber tow, before being cut, and drying the fibers in an unconstrained manner, such drying in of wrinkles can be avoided, thereby improving fiber strength.
6. Dried in wrinkles may be reduced or even avoided by drying straight fibers. However, straight fibers without crimp are difficult to handle in downstream operations like carding and sliver manufacture (poor web cohesion). Mechanical crimping without inducing fiber weaknesses is preferable, and preferably such crimping is made after at least partly drying the fiber tow, and before cutting the fiber tow into staple fibers.

Some or even all of the above listed issues related to fiber production from dissolved cellulose in alkali and coagulation in an alkaline coagulation bath can be tackled by using one or more of the embodiments described herein.

The invention claimed is:

1. A process for forming a fiber tow, said process involving a wet spinning procedure comprising the steps of:
    dissolving cellulose pulp in an alkaline aqueous solvent to form a cellulose spin dope composition;
    spinning the cellulose spin dope composition in a coagulation bath having a pH of more than 7.0, to produce a fiber tow; and
    passing the produced fiber tow through a sequence of consecutive stretching and washing steps in which the fiber tow is washed with washing liquid having gradually lower alkalinity.

2. The process according to claim 1, wherein the step of dissolving the cellulose pulp is performed in a cold alkaline aqueous solvent at a temperature of 0° C. or lower.

3. The process according to claim 1, wherein the process comprises passing the produced fiber tow through at least five consecutive washing steps.

4. The process according to claim 1, wherein at least one washing step is performed by spraying, the flow of spray washing liquid in at least some of the washing steps with spraying is at least 5 kg washing liquid per kg of cellulose spin dope composition supplied to the coagulation bath.

5. The process according to claim 1, wherein the alkali content, calculated as ppm by weight of NaOH, in the produced fiber tow is lowered gradually during the washing procedure to less than 50 ppm wt NaOH, calculated on dry fiber tow.

6. The process according to claim 1, wherein the coagulation bath comprises sodium hydroxide and sodium carbonate and/or sodium sulfate.

7. The process according to claim 2, wherein the cold alkaline aqueous solvent comprises 0.4-1.2 wt. % zinc (as Zn), calculated on the total weight of the cellulose spin dope composition.

8. The process according to claim 1, wherein the cellulose spin dope composition comprises cellulose, cellulose carbamate or another derivative of cellulose in the range of 4-12 wt. % calculated on the total weight of the cellulose spin dope composition.

9. The process according to claim 1, wherein the cellulose spin dope comprises urea or cellulose carbamate which at least partially is hydrolyzed in the coagulation bath and in the consecutive washing steps.

10. The process according to claim 8, wherein any ammonia formed from the hydrolysis of cellulose carbamate or urea is collected and discharged from the spinning step.

11. The process according to claim 1, wherein stretching of the fiber tow is performed and controlled by regulating the speed at which the fiber tow travels from the coagulation bath and through the consecutive washing steps.

12. The process according to claim 1, wherein the speed of the fiber tow as of washing step 1 is substantially maintained constant or is gradually increasing in one or more following washing steps at least up to and including the washing step after which the hydroxide concentration of the fiber tow is lower than 0.3 wt. %.

13. The process according to claim 1, wherein the stretching is controlled to a degree resulting in a total stretch in the range of 30-80%.

14. The process according to claim 1, wherein stretching of the fiber tow is performed between the coagulation bath and the first washing step and wherein the fiber tow is kept in a stretched condition during at least part of the process thereafter.

15. The process according to claim 1, wherein stretching of the fiber tow is performed between the coagulation bath and the first washing step and wherein stretching is continued during at least two consecutive washing steps, said at least two consecutive washing steps during which stretching is continued being among the four washing steps being arranged immediately after the coagulation bath, the portion of the total stretch being performed in the at least two washing steps being at least 25%.

16. The process according to claim 1, wherein a stretched condition, meaning that any substantial slack in the fiber tow is avoided, is maintained during at least 50% of the washing procedure.

17. The process according to claim 1, wherein stretching for elongation of the fiber tow is performed between the coagulation bath and the first washing step at a certain degree of stretching.

18. The process according to claim 1, wherein the largest part of the total stretch for elongation of the produced fiber tow is performed in a stretching step between the coagulation bath and the first washing step of the counter-current flow washing procedure, when comparing the elongation of the stretching step between the coagulation bath and the first washing step to the elongation of other individual stretching steps between and/or within washing steps of a counter-current flow washing procedure, and/or wherein at least 40% of the total elongation is performed between the coagulation bath and the first washing step of the counter-current flow washing procedure.

19. The process according to claim 1, wherein the largest part of the total stretch for elongation of the produced fiber tow is performed in a stretching step between the first and the second washing step and/or within the first or the second washing step.

20. The process according to claim 1, wherein the alkaline aqueous solvent comprises zinc, wherein the alkalinity is reduced in the fiber tow gradually during the washing procedure, and wherein zinc diffuses out from the fiber tow and into the washing liquid during the washing procedure.

21. The process according to claim 20, wherein zinc diffuses out from the fiber tow and precipitates in the washing liquid in at least one washing step, wherein the washing liquid is suspended to keep the precipitated zinc dispersed in the washing liquid, and wherein the precipitated zinc is transported together with the washing liquid to at least one upstream, as seen with regard to the transport direction of the fiber tow, washing step in dispersion without settling.

22. The process according to claim 21, wherein the precipitated zinc following a counter-current washing liquid is dissolved at increasing alkalinity of the washing liquid in at least one upstream washing step and is at least partially recycled and reused in the step of dissolving cellulose pulp in an alkaline aqueous solvent to form a cellulose spin dope composition.

23. The process according to claim 1, wherein the washed fiber tow is subjected to a drying operation in which the fiber tow is dried in an unconstrained fashion, substantially free from sharp bends, to allow free shrinkage substantially without tension in the fiber direction, to produce a washed and dried fiber tow.

24. The process according to claim 1, wherein the process also comprises crimping of the fiber tow.

25. The process according to claim 24, wherein mechanical crimping is performed subsequent to the drying of the fiber tow.

26. The process according to claim 24, wherein the process comprises cutting the dried and crimped fiber tow into staple fibers.

27. The process according to claim 1, wherein the fiber tow is treated with an acid in an acid treatment step subsequently to the last washing step in the washing procedure.

28. The process according to claim 1, wherein one or more surface active agents are supplied during the process to decrease cohesive forces between single filaments in the fiber tow, wherein said one or more surface active agents are supplied to the fiber tow subsequently to the washing procedure.

29. The process according to claim 1, wherein said pH of said coagulation bath is a pH of at least 10.

30. The process according to claim 1, wherein said step of passing the produced fiber tow through a sequence of consecutive stretching and washing steps in which the fiber tow is washed with washing liquid having gradually lower alkalinity is by a counter-current flow washing procedure.

31. The process according to claim 6, wherein the coagulation bath comprises 3-10 wt. % sodium hydroxide or 10-28 wt. % of at least one of sodium carbonate and sodium sulfate.

32. The process according to claim 16, wherein said fiber tow is subjected to stretching for elongation in at least two positions, of which a first position being between the coagulation bath and the first washing step and a second position being in at least one consecutive washing step, or wherein said fiber tow is subjected to stretching for elongation in at least two positions, said second position of stretching for elongation being inside the first washing step or between the first and second washing steps.

33. The process according to claim 17, wherein said stretching for elongation is continued during at least three consecutive washing steps, and/or wherein said stretching for elongation is continued between and/or within at least three consecutive washing steps at a total degree of elongation being in the range of 0.7 to 1.2 times the stretching being performed between the coagulation bath and the first washing step.

34. The process according to claim 33, wherein an added degree of stretching in each step is lower than the added degree of stretching in the step between the coagulation bath and the first washing step, and/or wherein the added degree of stretching decreases in each consecutive step.

35. The process according to claim 24, wherein said crimping of the fiber tow is performed subsequently to drying of the fiber tow.

36. The process according to claim 28, wherein said one or more active agents are supplied to the fiber tow subsequently to a possible acid treatment step or wherein said one or more active agents are supplied to the fiber tow before the drying procedure.

* * * * *